(12) United States Patent
Toriyama et al.

(10) Patent No.: US 7,099,020 B1
(45) Date of Patent: Aug. 29, 2006

(54) IMAGE PROCESSING APPARATUS SWITCHABLE FROM FULL COLOR MODE TO MONOCHROMATIC MODE

(75) Inventors: Hideyuki Toriyama, Toyokawa (JP); Hiroyuki Suzuki, Toyokawa (JP); Hideaki Mizuno, Toyokawa (JP); Nobuo Kamei, Toyokawa (JP); Tsuyoshi Yoneyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 756 days.

(21) Appl. No.: 09/722,882

(22) Filed: Nov. 28, 2000

(30) Foreign Application Priority Data

Nov. 29, 1999 (JP) ................................. 11-337752

(51) Int. Cl.
  G06F 15/00 (2006.01)
  G06F 15/16 (2006.01)
  G06F 13/14 (2006.01)
  H04N 1/46 (2006.01)
  G03F 3/08 (2006.01)

(52) U.S. Cl. ...................... 358/1.13; 358/501; 358/518; 358/523; 358/412; 358/448; 358/1.9; 345/502; 345/519; 345/520; 345/522

(58) Field of Classification Search ................ 358/518, 358/538, 540, 448, 523, 412, 1.13, 501; 345/502, 345/503, 519, 520, 522, 1.9
See application file for complete search history.

(56) References Cited

U.S. PATENT DOCUMENTS

| | | | | |
|---|---|---|---|---|
| 5,585,856 A | * | 12/1996 | Nakaya et al. | 348/441 |
| 5,856,832 A | * | 1/1999 | Pakenham et al. | 345/540 |
| 5,868,666 A | | 2/1999 | Okada et al. | |
| 5,973,802 A | * | 10/1999 | Hirota et al. | 358/521 |
| 5,991,055 A | * | 11/1999 | Haselby et al. | 358/509 |
| 6,252,609 B1 | | 6/2001 | Kanno | |
| 6,337,692 B1 | * | 1/2002 | Rai et al. | 345/594 |
| 6,339,654 B1 | * | 1/2002 | Yamada | 382/162 |
| 6,344,906 B1 | * | 2/2002 | Gatto et al. | 358/443 |
| 6,504,628 B1 | * | 1/2003 | Kanno et al. | 358/522 |
| 2001/0050774 A1 | | 12/2001 | Sato et al. | |

FOREIGN PATENT DOCUMENTS

| | | |
|---|---|---|
| JP | 7-298067 A | 11/1995 |
| JP | 11-41479 | 2/1999 |
| JP | 11-088584 A | 3/1999 |
| JP | 11-146218 | 5/1999 |
| JP | 11-317887 | 11/1999 |

OTHER PUBLICATIONS

The IEEE Standard Dictionary of Electrical and Electrionics Terms, 6th edition, pp. 403.*
*English Translation of Japanses Notice of Reasons of Refusal issued in corresponding Japanese Patent Application No. 11-337752.

* cited by examiner

Primary Examiner—Douglas Q. Tran
Assistant Examiner—Chan S. Park
(74) Attorney, Agent, or Firm—Buchanan Ingersoll & Rooney PC

(57) ABSTRACT

In an image processing apparatus for processing image data in either operation mode of a full color mode or a monochromatic mode having processing speed higher than the full color mode, at least a part of an image processing circuit comprises a rewritable device such as a field gate programmable array. A controller rewrites an internal circuit in the rewritable device according as the operation mode is the full color mode or the monochromatic mode. The internal circuit in the rewritable device rewritten in the monochromatic mode performs processing based on pixel clock faster than in the full color mode.

6 Claims, 5 Drawing Sheets

IMAGE PROCESSING APPARATUS SWITCHABLE FROM FULL COLOR MODE TO MONOCHROMATIC MODE

This application is based on application No. 11-337752 filed in Japan, the contents of which are hereby incorporated by reference.

BACKGROUND OF THE INVENTION

1. Field of the Invention

The present invention relates to image data processing.

2. Description of Prior Art

In a color image processing apparatus, it is known to change processing speed according to the operation mode of full color mode or monochromatic mode. In monochromatic mode, the pixel clock is increased compared to full color mode in order to increase the number of copies per unit time. Two circuits for full color mode and for monochromatic mode are provided, and they are fabricated so that they can be operated at the processing speed of monochromatic mode.

However, in the above image processing apparatus wherein the two circuits for full color mode and for monochromatic mode are provided, they are composed of individual components, and they are designed to be adapted to the faster processing speed among the two modes. Therefore, many latches are also inserted in the circuit for full color mode as a combination of components to conform with monochromatic mode. Thus, as the two circuits for full color mode and for monochromatic mode are provided in the image processing apparatus, the cost of the apparatus becomes high.

SUMMARY OF THE INVENTION

An object of the present invention is to provide an image processing apparatus having a simple structure.

In one aspect of the invention, an image processing apparatus for processing image data in either operation mode of a full color mode or a monochromatic mode having processing speed higher than the full color mode, comprises an image processing circuit, at least a part thereof comprising a rewritable device such as a programmable field gate array, and a controller for rewriting an internal circuit in the rewritable device according as the operation mode is the full color mode or the monochromatic mode. The internal circuit in the rewritable device is rewritten according as the operation mode is the full color mode or the monochromatic mode. The internal circuit in the rewritable device in the monochromatic mode rewritten in the monochromatic mode performs processing based on pixel clock faster than that in the full color mode.

For example, the internal circuit in the rewritable device rewritten in the monochromatic mode comprises a plurality of latches provided for timing adjustment and the latches are arranged at shorter distance than in the full color mode. Thus, the number of stages in the rewritable device can be changes according to the selected pixel clock. In the monochromatic mode which uses faster speed than the full color mode, the latches in a combination of components in the rewritable device are provided to have a narrower distance. In other words, the latches are inserted with shorter distances in the combination of components in the rewritable device as the clock becomes faster.

For example, the internal circuit in the rewritable device operates as a circuit for performing density conversion which converts the image data to density data and the following processings.

Further, preferably, the image processing apparatus further comprises a memory device for storing data for rewriting the internal circuit in the rewritable device. The controller rewrites the internal circuit in the rewritable device based on the data stored in the memory device.

In another aspect of the invention, an image processing apparatus comprises an image processing circuit for processing image data in either operation mode of a full color mode or a monochromatic mode, at least a part of the image processing circuit being constructed with a field programmable gate array, and a controller for changing a circuit structure of the field programmable gate array according as the operation mode is the full color mode or the monochromatic mode. For example, the circuit structure of the field programmable gate array comprises a plurality of latches whose number in the monochromatic mode is larger than that in the full color mode.

An advantage of the present invention is that the full color mode and the monochromatic mode are realized as time-sharing modes and that enlargement in the circuit scale of the image processing apparatus is suppressed because a rewritable device is used in the device in the image processing circuit.

Another advantage of the present invention is that insertion of abundant latches is prevented and that enlargement in the circuit scale is suppressed because the circuit for the full color mode having larger circuit scale than the monochromatic mode does not have the same processing speed.

It is a further advantage that consumption power is decreased in an image processing apparatus.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
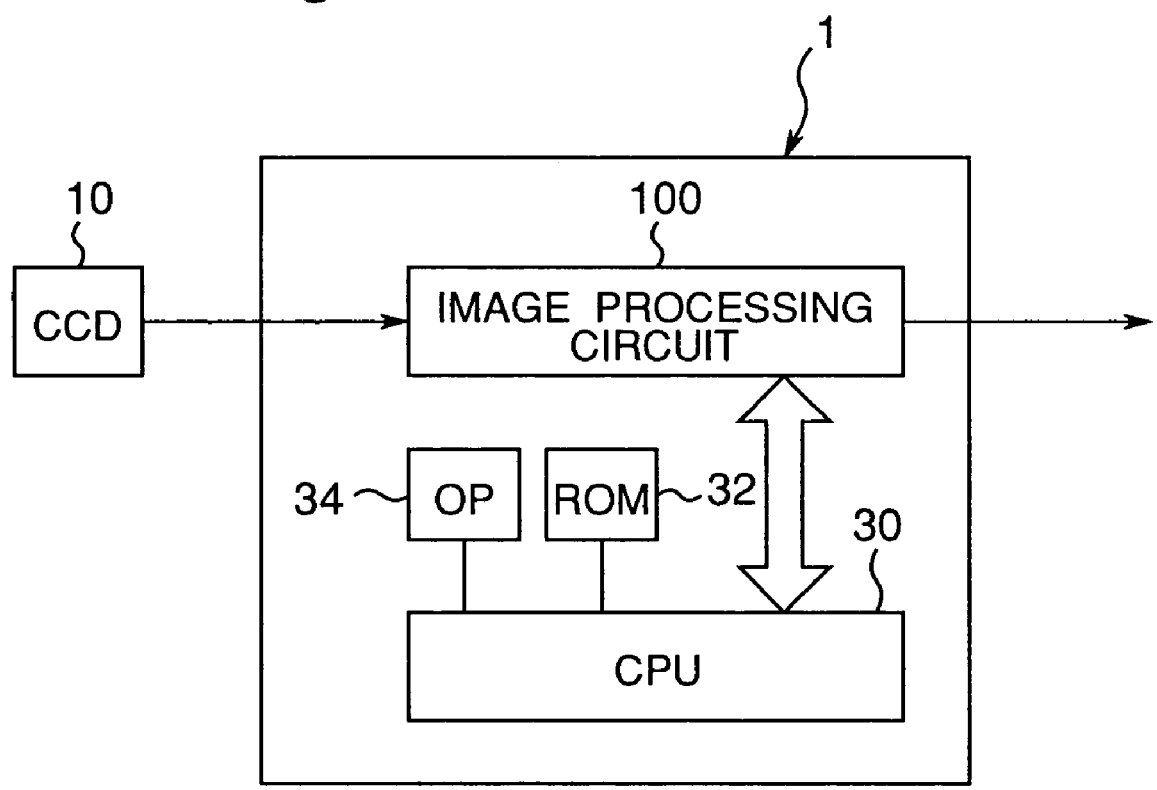
FIG. 1 is a block diagram of an image processing apparatus.

Referring now to the drawings, wherein like reference characters designate like or corresponding parts throughout the several views, FIG. 1 shows a schematic diagram of an image processing apparatus 1 according to an embodiment of the invention. The image processing apparatus 1 comprises an image processing circuit 100. The image processing apparatus 1 is connected to, for example, a scanner (not shown). The image processing apparatus 1 receives image data generated from a charge coupled device (CCD) 10 in the scanner, performs predetermined processings to the image data and sends the processed data to an apparatus at a following stage such as a printer. Image data to be processed by the image processing apparatus 1 is not limited to the image data generated by a CCD in the scanner or the like connected thereto. It may be image data generated by an application software in a computer or image data received through a network. The image processing apparatus 1 may be operated in either operation mode of full color mode for processing color image data or monochromatic mode for processing monochromatic image data. The processing speed is faster in monochromatic mode than in full color mode. The image processing apparatus 1 rewrites a circuit structure in a part of the image processing circuit 100 according as the operation mode is full color mode or monochromatic mode.

Figure 2:
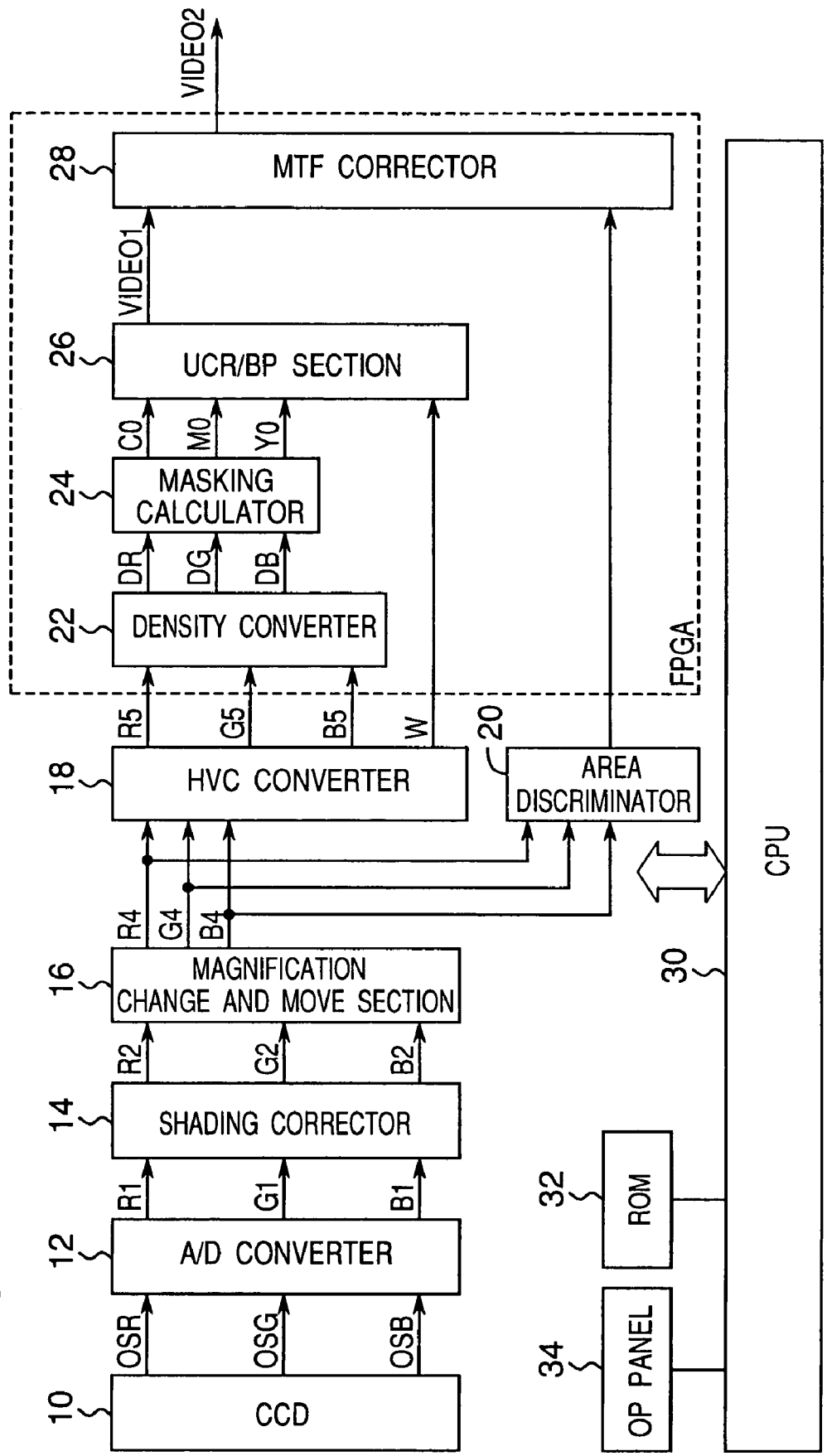
FIG. 2 is a block diagram of an entire structure of an image processing circuit in full color mode.

FIG. 2 shows an entire structure of the image processing circuit 100 in full color mode, wherein a portion enclosed by a dashed line represents a device wherein the circuit to be constructed therein can be rewritten repetitively in a state where components are mounted in the circuit. The device is for example a field programmable gate array (hereinafter referred to as FPGA). A read only memory (hereinafter referred to as ROM) 32 stores algorithm information for processing the circuits for the FPGA. A circuit according to an operation mode is written to the device when a central processing unit (hereinafter referred to as CPU) 30 programs the FGPA with reference to the ROM 32. Thus, a plurality of functions can be constructed in a relatively small gate scale. The operation mode can be set, for example, with an operational panel 34.

In this embodiment, in full color mode, processing circuits, comprising a density converter 22, a masking calculator 24, an undercolor remove and black paint (UCR/BP) section 26 and a mutual transfer function (MTF) corrector 28, are written to the FPGA. In full color mode, the processing speed is slower and the period of pixel clock is 6t.

Output signals of a color CCD sensor 10 consisting of line sensors of three colors are converted by an analog-to-digital (A/D) converter 12 to digital data of red (R), green (G) and blue (B). After corrected on shading by a shading corrector 14, the digital data are sent to a magnification change and move section 16. The data R4, G4, B4 which have been subjected in the section 16 to the magnification change processing and move processing are sent to an HVC converter 18 and an area discriminator 20. The HVC converter 18 converts the data R4, G4, B4 to HVC data and sends chroma data W to the undercolor remove and black paint section 26, while it sends the input data to the density converter 22 as data R5, G5, B5. The density converter 22 converts data R5, G5, B5 to density data DR, DG, DB, and the masking calculator 24 converts the density data DR, DG, DB to print color data of cyan (C0), magenta (M0) and yellow (Y0) by using a matrix calculation. Further, the undercolor remove and black paint section 26 performs the undercolor remove and black paint processing on the print color data C0, M0, Y0 by using the chroma data W to output data VIDEO1. On the other hand, the area discriminator 20 discriminates various types of areas based on the input data R4, G4, B4. The MTF corrector 28 corrects the data VIDEO1 according to the discrimination result of the area discriminator 20 and performs edge correction or the like. Then the data VIDEO2 are sent to a printer. The CPU 30 controls the above-mentioned image processing circuit 100.

Figure 3:
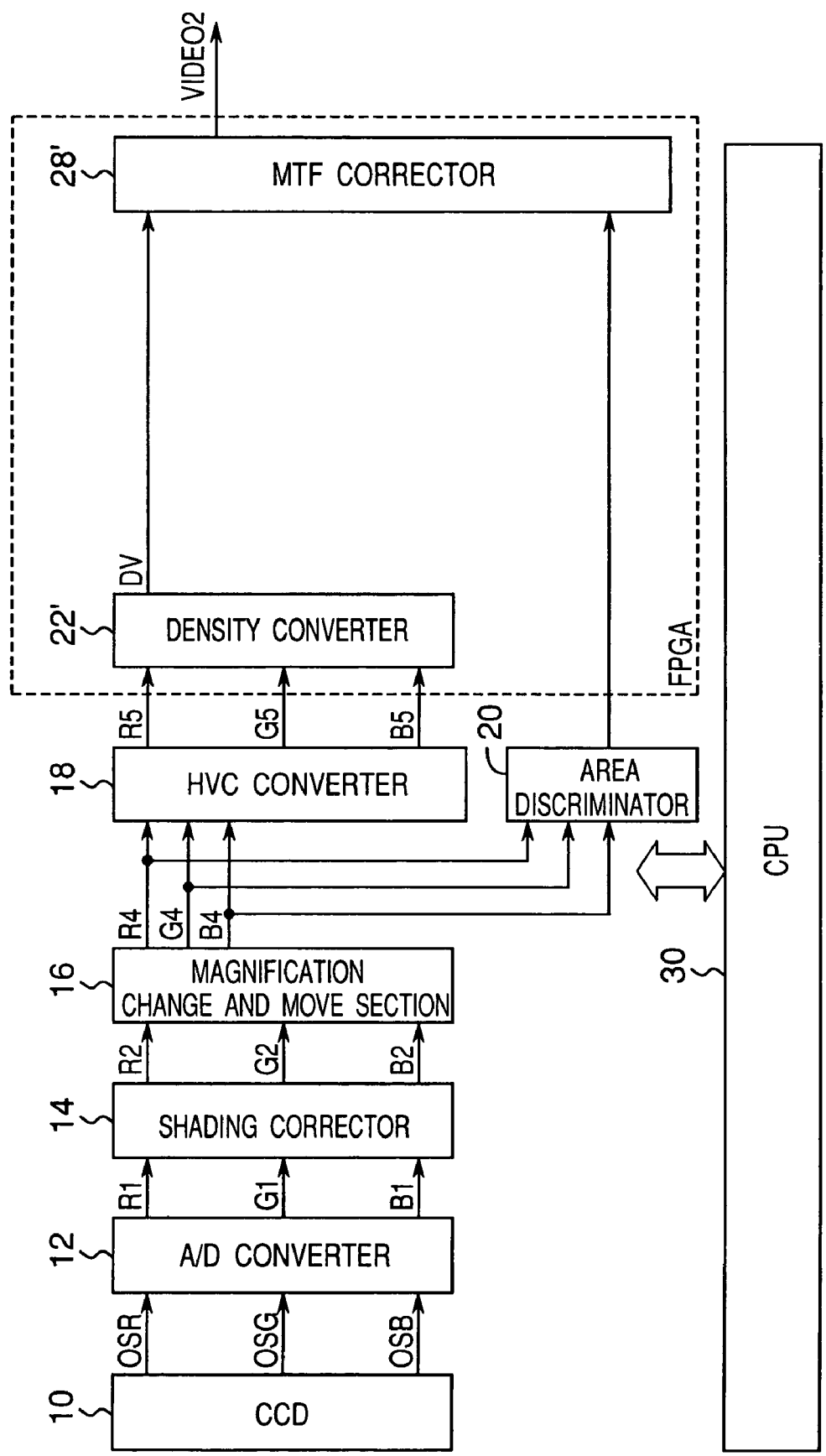
FIG. 3 is a block diagram of an entire structure of the image processing circuit in monochromatic mode.

FIG. 3 shows an entire structure of the image processing circuit 100 in monochromatic mode. It is similar to the counterpart shown in FIG. 1, but the content of the circuit written to the FPGA is different. In monochromatic mode, the processing circuit of a density converter (value) 22' and an MTF corrector 28' is written to the FPGA. In monochromatic mode, the period of pixel clock is 4t, and the processing speed is faster in monochromatic mode than in full color mode.

The HVC converter 18 receives the data R4, G4, B4 and sends them to the density converter 22' as data R5, G5, B5. The density converter 22' converts the data R5, G5, B5 to density data DV. Further, the area discriminator 20 discriminates various types of areas based on the input data. The MTF corrector 28' corrects the data DV according to the discrimination result of the area discriminator 20 and sends the corrected data VIDEO2 to a printer.

Figure 4:
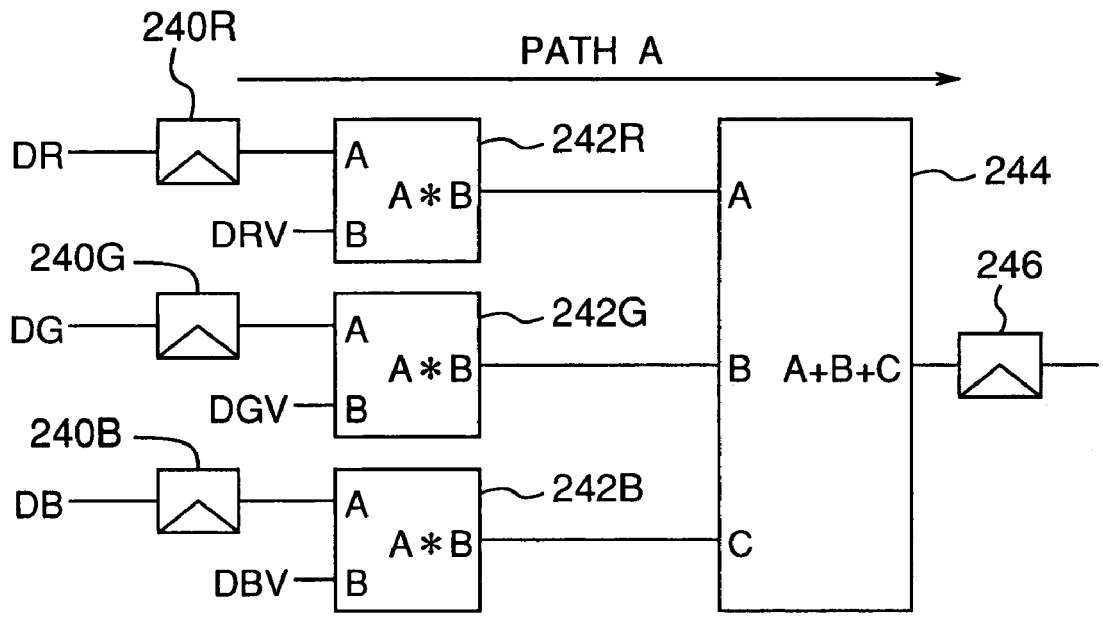
FIG. 4 is a diagram of a part of a masking calculator in full color mode.

FIG. 4 shows a part of the masking calculator 24 in full color mode. The masking calculator 24 performs following calculation:

$$DR*DRV+DG*DGV+DB*DBV.$$

First, the density data DR, DG, DB converted from the reflection data by the density converter 22 are latched by latches 240R, 240G, 240B. Next, the density data DR, DG, DB are multiplied with coefficients DRV, DGV, DBV by multipliers 242R, 242G, 242B. The results of the multiplication are added by an adder 244. A latch 246 latches the sum of the adder 244 and sends it to a following stage. It is to be noted that many latches (flip flops in this example) are arranged to interpose the multipliers 242R, 242G, 242B and the adder 244. The latches are operated at leading edges of pixel clocks. A path which routes via the multipliers 242R, 242G and 242B and the adder 246 is referred to as path A.

Figure 5:
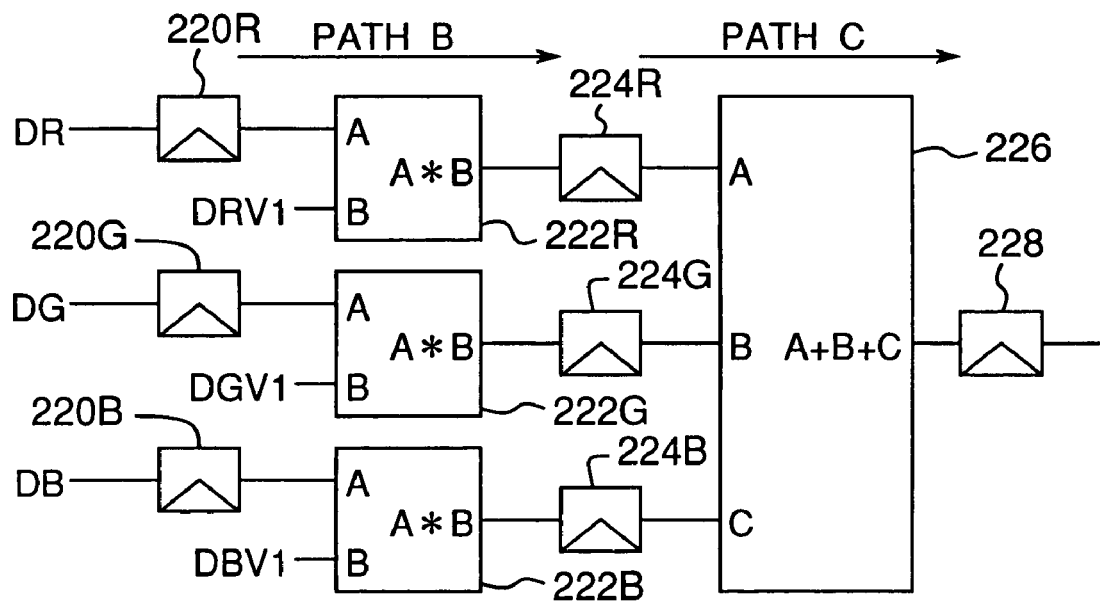
FIG. 5 is a block diagram of a value data generator in a density converter in monochromatic mode.

FIG. 5 shows a value data generator in a density converter 22' in monochromatic mode. The formula of density conversion is as follows.

$$V=DR*DRV1+DG*DGV1+DB*DBV1.$$

A density converter 22' generates value V from the density data DR, DG, DB converted from the reflection data and sends them to the MTF corrector 28'. First, the density data DR, DG, DB are latched by latches 220R, 220G, 220B. Next, the latched density data DR, DG, DB are multiplied with coefficients DRV1, DGV1, DBV1 by multipliers 222R, 222G, 222B. The multiplied data are latched by latches 224R, 224G, 224B. Then, the results of the multiplication are added by an adder 226. A latch 228 latches the sum of the adder 226 and sends it to a following stage. Latches 220R, 220G, 220B and 224R, 224G, 224B are arranged to interpose the multipliers 222R, 222G, 222B, while lathes 224R, 224G, 224B and 228 are arranged to interpose the adder 226. The latches are operated at leading edges of pixel clocks. (The coefficients are set by the CPU 30 in the circuits shown in FIGS. 4 and 5.) A path which routes via the multipliers 222R, 222G and 222B is referred to as path B, and another path which routes via the adder 226 is referred to as path C.

Figure 6:
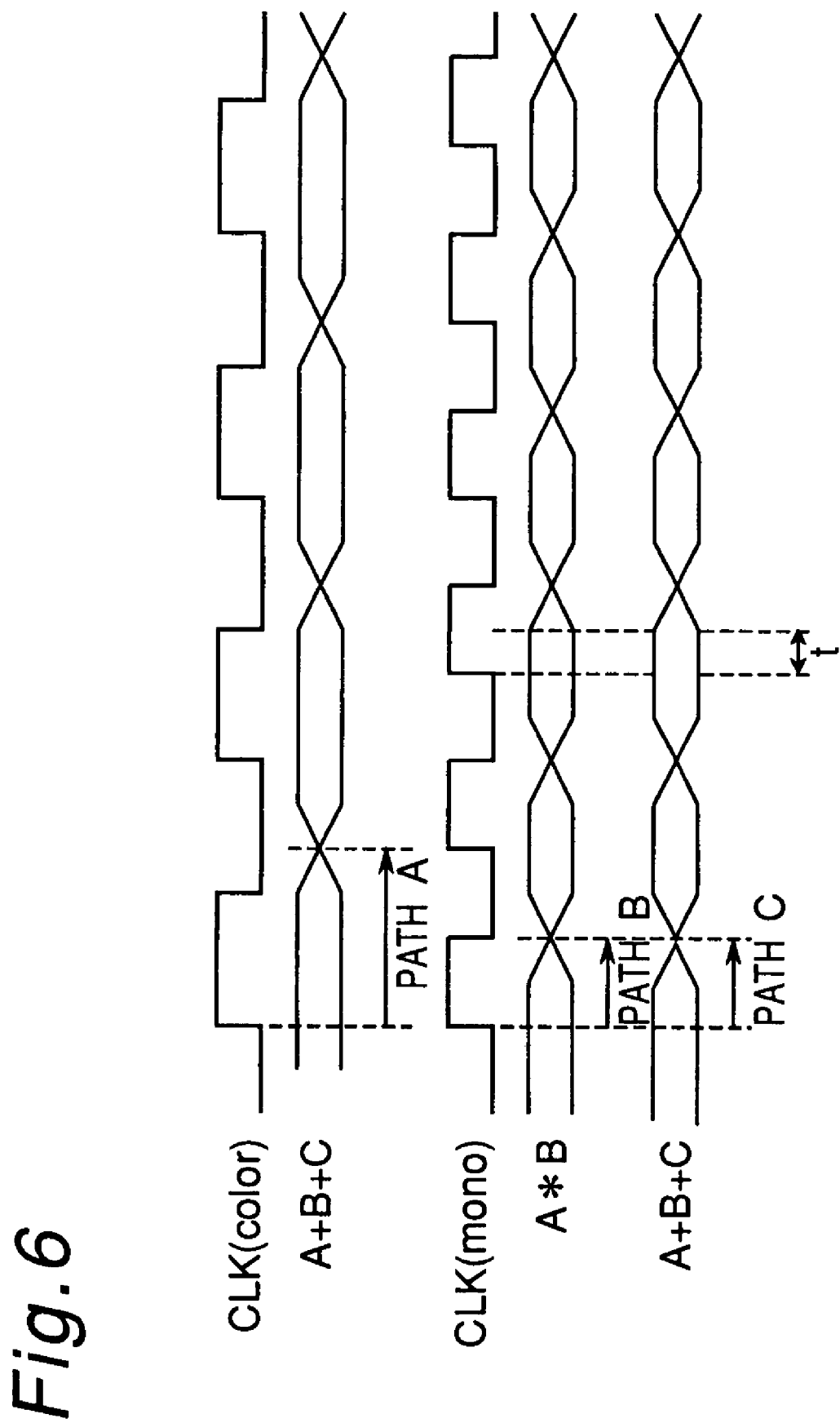
FIG. 6 is a timing chart for illustrating delay time of passes shown in FIGS. 4 and 5.

A timing chart shown in FIG. 6 shows delay times in the paths shown in FIGS. 4 and 5 wherein t represents unit time. The period of pixel clock (CLK(color)) is 6t in full color mode or the processing speed is slower. In monochromatic mode, the period of pixel clock is 4t or the processing speed is faster. That is, the processing speed in monochromatic mode is set to 1.5 times that in full color mode. In monochromatic mode, delay time in the path of the multipliers 222R, 222G, 222B (path B) in the density converter 22' is 2t, while in full color mode, delay time in the path of the multipliers 242R, 242G, 242B and the adder 244 (path A) in the masking calculator 24 is 4t.

It is understood from the timing chart that in monochromatic mode, if the latches (flip flops) 224R, 224G, 224B are not inserted between the multipliers 222R, 222G, 222B and the adder 226, delay time between the multipliers and the adder is 4t, and it is the same as the period of pixel clock. Thus, the flip flop following the adder cannot receive the data. On the other hand, in full color mode, because the period of clock is 6t, it is not needed to insert latches between the multipliers and the adder. That is, in the circuit written to the FPGA, the distance(s) of the latches to be inserted in the circuit as a combination of components including a multiplier, an adder and the like are determined according to the processing speed. It is to be noted that the distance does not mean physical distance, but electronic path along which electrons move.

As explained above, in the image processing apparatus according to this embodiment, an image processing circuit comprises a rewritable device. Therefore, full color mode and monochromatic mode are realized in time sharing mode, and enlargement in the scale of the circuit is suppressed. Further, while full color mode has a larger circuit scale than monochromatic mode, the processing speed in full color mode becomes slower than that in monochromatic mode. Therefore, insertion of abundant latches in the image processing circuit can be prevented, and enlargement of circuit scale can be suppressed.

When the above-mentioned apparatus is not use for a long time, for example, in standby mode, the contents in the FPGA is erased for a while. That is, the contents of the FPGA is blank in standby mode.

In the above-mentioned embodiment, a portion from the density converter 22 to the MTF corrector 28 in the image processing circuit is an object to be rewritten. However, a different portion therein may also be an object to be rewritten.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus for processing image data in either operation mode of a full color mode or a monochromatic mode having processing speed higher than the full color mode, the image processing apparatus comprising:
   an image processing circuit, at least a part thereof comprising a rewritable device;
   a controller for rewriting an internal circuit in said rewritable device according as the operation mode is the full color mode or the monochromatic mode;
   wherein the internal circuit in said rewritable device rewritten in the monochromatic mode performs processing based on pixel clock faster than in the full color mode; and
   wherein the internal circuit in said rewritable device rewritten in the monochromatic mode comprises a plurality of latches provided for timing adjustment and the latches are arranged at shorter distance than in the full color mode.

2. The image processing apparatus according to claim 1, wherein the internal circuit in said rewritable device operates as a circuit for performing at least density conversion which converts the image data to density data.

3. The image processing apparatus according to claim 2, wherein said controller rewrites the internal circuit in said rewritable device to perform density conversion, masking calculation, undercolor remove and black paint processing, and MTF correction in full color mode and to perform density conversion and MTF correction in monochromatic mode.

4. The image processing apparatus according to claim 1, further comprising a memory device for storing data for rewriting the internal circuit in said rewritable device, wherein said controller rewrites the internal circuit in the rewritable device based on the data stored in said memory device.

5. The image processing apparatus according to claim 1, wherein said rewritable device is a field programmable gate array.

6. An image processing apparatus comprising:
   an image processing circuit for processing image data in either operation mode of a full color mode or a monochromatic mode, at least a part of the image processing circuit being constructed with a field programmable gate array; and
   a controller for changing a circuit structure of said field programmable gate array according as the operation mode is the full color mode or the monochromatic mode;
   wherein the circuit structure of said field programmable gate array comprises a plurality of latches whose number in the monochromatic mode is larder than that in the full color mode.

* * * * *